United States Patent
Appo (10) Patent No.: US 7,484,295 B2
(45) Date of Patent: Feb. 3, 2009

(54) METHOD OF MOUNTING A METAL SHEET RING ASSEMBLED AND WELDED IN A CARRIER HOOP TO CONFORM THE ANNULAR COOLING TUBE OF A PISTON OF INTERNAL COMBUSTION ENGINE

(76) Inventor: Roberto Oscar Appo, Avda. Diagonal 170 1° 4°, Barcelona (ES)

( * ) Notice: Subject to any disclaimer, the term of this patent is extended or adjusted under 35 U.S.C. 154(b) by 458 days.

(21) Appl. No.: 10/485,304

(22) PCT Filed: Jul. 18, 2002

(86) PCT No.: PCT/ES02/00365

§ 371 (c)(1),
(2), (4) Date: Jan. 30, 2004

(87) PCT Pub. No.: WO03/011497

PCT Pub. Date: Feb. 13, 2003

(65) Prior Publication Data

US 2004/0244194 A1    Dec. 9, 2004

(30) Foreign Application Priority Data

Jul. 30, 2001   (AR) ............................. P010103621
Jul. 30, 2001   (AR) ............................. P010103622

(51) Int. Cl.
*B21K 1/18*   (2006.01)
*F01P 3/10*   (2006.01)

(52) U.S. Cl. .............. 29/888.045; 29/888.042; 29/888.044; 29/888.07; 123/41.35

(58) Field of Classification Search .............. 29/888.07, 29/888.073, 888.071, 888.03, 888.045, 888.042, 29/888.044; 92/211, 222, 186; 123/41.16, 123/193.4; 72/333, 370.11, 334

See application file for complete search history.

(56) References Cited

U.S. PATENT DOCUMENTS 1,428,777 A    9/1922   Granlow (Continued)

FOREIGN PATENT DOCUMENTS

DE    19722053    12/1998

(Continued)

*Primary Examiner*—David P Bryant
*Assistant Examiner*—Sarang Afzali
(74) *Attorney, Agent, or Firm*—Merek, Blackmon & Voorhees, LLC (57) ABSTRACT

A metal sheet ring (5) has a web (15) extending between two fins (10) and (11) projecting towards a carrier hoop (6), wherein free ends of the fins rest on and couple to respective annular seats (8) and (9) defined in an internal face of the carrier hoop, the free ends being sealed by respective annular welding beads (14) to form an internal annular cooling tube (3) having an inside surface constituted by the metal sheet ring and the inside surface (7) of the carrier hoop. For the support and coupling of the ring (5) on the carrier hoop, a preform of the ring, formed outside of the carrier hoop, has a preform fin (10') open at an angle slightly greater than the angle of the other preform fin (11) and with a free end of smaller diameter than the inside surface diameter (7) of the carrier hoop (6), while the other preform fin (11) has a larger diameter than the diameter of the inside surface (7) of the carrier hoop (6) in a way that a final stamping action, which is the only action performed with the preform in the carrier hoop, gives the final configuration to the fin (10) of the metal sheet ring (5).

6 Claims, 8 Drawing Sheets

U.S. PATENT DOCUMENTS

| | | | |
|---|---|---|---|
| 1,623,325 A | | 4/1927 | Wetmore |
| 4,120,081 A | * | 10/1978 | Rosch et al. ............ 29/888.045 |
| 4,907,545 A | * | 3/1990 | Mills ........................ 123/41.35 |
| 6,105,540 A | * | 8/2000 | Bing et al. ................ 123/41.35 |

FOREIGN PATENT DOCUMENTS

| | | |
|---|---|---|
| FR | 2044242 | 2/1971 |

* cited by examiner

METHOD OF MOUNTING A METAL SHEET RING ASSEMBLED AND WELDED IN A CARRIER HOOP TO CONFORM THE ANNULAR COOLING TUBE OF A PISTON OF INTERNAL COMBUSTION ENGINE

The present invention relates to a method of mounting a metal sheet ring assembled and welded in a carrier hoop to form the annular cooling tube of a piston of an internal combustion engine, and a method of manufacturing a fin metal sheet ring assembled with a carrier hoop.

More particularly, this invention contemplates a mounting of a metal sheet ring assembled and welded to a carrier hoop capable of being engaged with the pistons of internal combustion engines and forming a internal cooling tube, usually called a cooling gallery.

This invention refers to a manufacturing method especially created to form a finned metal sheet ring of such a type that, once assembled and welded to a carrier hoop, is coupled to the body of a piston of an internal combustion engine to form an internal cooling tube, also called a cooling gallery.

As it is well known, the pistons used in internal combustion engines, particularly in diesel engines, are subject to extreme thermal conditions and great mechanical forces, thereby requiring long durability under severe conditions, as they are subject to important loads due to the pressure of the combustion impact and the heat being generated.

That is why various pistons designs already known include the existence of an internal cooling tube that is generally located adjacent to the annular piping housing the top hoop of the piston. Thereby, a cooling liquid, generally oil, circulates through the internal tube for the purpose of counteracting the action of the extreme temperatures to which the piston and the hoops thereof are being exposed. In order for this action to be effective, it is required that the cooling path be as near as possible to the piping housing the compression rings.

Indeed, the extreme thermal conditions and mechanical solicitudes make certain parts of the piston subject to special strengths that, due to the above mentioned reasons, may suffer damage or fault. The cooling of the most affected zones or paths is made possible by the creation of the above-mentioned cooling internal tubes that configure the cooling internal galleries through which cooling oil may circulate.

Several techniques for the manufacturing of these cooling tubes have been developed, wherein different types of structures and designs are determined, the tubes being generally annular and being able to communicate with passages extending towards an inside space of the piston body.

The mounting of the present invention is applicable to an aluminum alloy piston for internal combustion engines, one of the type having a top circular head (piston head) and a cylindrical wall extending downwards from the head. In this case, the head, also includes a metal insert defining the annular cooling tube arranged within the head, the metal insert being constituted by a carrier hoop radially extending, coaxial to the shaft of the piston body and supporting a metal sheet ring having a cross section similar to a "U" or equivalent assembled and welded to the carrier hoop.

This invention introduces the novelty that specifically refers to the mounting being used for the attachment and coupling of the metal sheet ring on the carrier hoop. The mounting makes sure the ring is kept duly positioned and fixed on the carrier hoop before the welding is carried out, the use of stress due to differences of thermal expansion not being required, and providing a convenient support for the welding bead.

The great advantage of the inventive mounting is the low cost of the coupling and the great efficacy and security being achieved, above all, for the application of the continuous welding bead, thereby establishing the close binding of the two component parts.

Normally, the piston body is of an aluminum constitution and is manufactured by casting, such that the cooling tube is an insert that is located into a constitution die, previous to tapping, to be arranged within the piston body. This insert comprises a carrier hoop that is usually cast iron, with nickel and copper, and the metal sheet ring of a cross section, such as a "U", wherein the free ends of its fins are arranged welded to the carrier hoop. Under these circumstances, the piston integrity and its structure are maintained.

Accordingly, an internal annular tube is introduced whose walls are constituted by the metal sheet ring in a "U"-shape or its equivalent and the inside radial surface of the carrier hoop, the metal sheet ring and the carrier hoop being previously bound to each other by welding. An effective union is intended to be established such that it makes sure that material does not enter the inside of the cooling tube during the aluminum tapping that is carried out in the process of the casting manufacture of the piston.

In order to achieve an effective union between the metal sheet ring and the carrier hoop, it is important for the sealing welding to be hermetic and secure in order to avoid the entrance of aluminum to the inside of the tube, as well as the exit of hot gas from the inside of the internal annular tube to the liquid aluminum being poured during the tapping process.

In order to be sure that this welding is hermetic, it is highly important that the metal sheet ring is coupled to its respective carrier hoop without carrying stress that may affect such welding. Thus, it is highly important to create metal sheet rings having dimensions extremely precise and with a final constitution that will not transmit stress to the carrier hoop during the welding process.

It is contemplated that there exist several format and design options for these annular cooling tubes, the options being in accordance the final use the piston containing the cooling tube will have. Many of these several designs are realized by variations in the format of the fin metal sheet ring.

This invention specifically refers to a new method for the manufacturing of these finned metal sheet rings, wherein the options previously mentioned of design variation of the final format are also included.

PRIOR ART

As it was previously noted, several inserts applied to the pistons are already known in order to provide the mentioned annular cooling tube. Special manufacturing methods have also been disclosed to justify the requirements of security and resistance capacity.

To this effect, the following patents may be cited as examples: U.S. Pat. Nos. 4,776,075; 4,586,553; and 3,991,811, all of which disclose respective designs of pistons with internal annular cooling galleries.

U.S. Pat. No. 5,903,974 refers to a method and apparatus to produce grooved hollow insert hoops for engine pistons, wherein the hoop is arranged near the top or piston head so as to constitute internal piping for a cooling passage adjacent to the hoop slot. Therefore, a structure is formed including a metal sheet ring having a cross section of a "U" shape and a molded carrier hoop. The molded carrier hoop is made of a high resistance material, preferably of the same thermal expansion coefficient as the piston body. The two elements are bound by a welding bead that fixes the outside part of the "U" section ring and the inside radial surface of the carrier hoop. Accordingly, the tube being adjusted for the cooling liquid circulation is defined by the inside radial surface of the carrier hoop and the one of the metal sheet ring of "U" section.

The disadvantage, in this case, is particularly the precision required for the mutual coupling of the two pieces that provides the correct adjustment of the cooling tube such that, when used, no undesirable cracks occur due to relative movements of these elements bound by the welding bead.

Indeed, U.S. Pat. No. 5,903,974 establishes that the internal diameter of the carrier hoop should be slightly less than the diameter of the free ends of the "U" branches of the metal sheet ring being assembled. To establish the union, the carrier hoop should be previously heated to cause the internal diameter to expand, such that, in this way, the sheet of "U" section exerts pressure and keeps itself duly positioned during the welding work.

This welding, which has neither a base nor a backing, is very difficult to be carried out. It is only possible by means of sophisticated methods that are of a very high operative cost.

Furthermore, the paths being assembled should be mechanized with very low tolerances such that, in any case, the interferences that should take place are always maintained.

That is to say, thermal expansion is used to get the desired and stable positioning of the pieces to be bound, which in turn, besides being of high cost, if such binding of pieces is not carried out properly, takes the risk that stresses taking place during the use of the piston may cause undesirable cracks.

Apart from the above mentioned, it is contemplated that this construction only makes possible the constitution of cooling tubes limited to a "U" cross section pattern of parallel faces, which is highly restrictive, as there exist many pistons designs of other section formats according to various requirements.

The main problem for all these embodiments consists of achieving a very good assembly and positioning of the "U" section metal sheet on the inside surface of the carrier hoop, this being rather difficult and generally of a high cost, above all for the previously mentioned tasks of assembly, positioning and also welding that have to be carried out.

It is especially mentioned that in this mounting, no backing fitting for the welding bead that determines the union of both components, is required, the process being difficult to be carried out and insecure as regards the air tightness required.

Different patent documents disclose approaches to this matter. One of them is the patent DE 26 24 412 that discloses that a metal sheet in a flat circular crown shape is placed on the annular cavities that the carrier hoop presents to this effect. The metal sheet is folded over the hoop and adjusted therein with a proper tool. Then, the sealing of the union is carried out by applying welding to the contact edges.

The disadvantage or inconvenient of this mounting is that the adjustment of the folding is limited by the body itself of the carrier hoop that prevents the metal sheet from being firmly adjusted before the welding.

It is not possible to assure that the metal sheet will be properly assembled at the desired position, exerting adequate pressure against the body of the carrier hoop, before the welding process.

U.S. Pat. No. 6,105,540 is also mentioned as part of the prior art and discloses a cooling annular mounting applicable to an internal combustion engine, the cooling annular mounting comprising a cooling tube formed by a metal sheet welded to a supporting carrier hoop.

The novelty introduced by this US patent is that, in this case, the metal sheet having a "U" section keeps itself pressing on the inside annular surface of the carrier hoop and is not contracted by the temperature differences between the hoop and the cooling tube. That is to say, it has an advantage over the previous embodiments in that expansion differences need not being taken into account for the mounting of the metallic hoop in the carrier ring.

The object of this U.S. Pat. No. 6,105,540 is to provide an insert for the adjustment of the cooling tube to make sure that there is an adequate positioning of the metallic hoop on the carrier ring before the welding process, such that a firm and secure welding joint is established between the carrier hoop and the metal sheet ring.

The invention of U.S. Pat. No. 6,105,540 contemplates that the precise and stable assembly should be made by using tools applying temperature on the metal sheet ring, though it mentions that the application of temperature differences may be omitted.

The basic idea disclosed and covered by this U.S. Pat. No. 6,105,540 is to use the properties of "certain elasticity" of the metal sheets to help their positioning in the carrier hoop, keeping themselves with certain pressure against the inside radial surface of the hoop such that the welding process may be properly carried out.

It is thereby established as a condition that the angle between the inside surface(s) of the carrier hoop and the branches of the "U" of the metal sheet ring should be less than 45°, due to the fact that, if this measurement is exceeded, the mounting will not be benefited by the referred to "elasticity".

Though, as from this constructive principle of mounting, advantages occur as compared to what was previously known, some disadvantages may appear that are clearly overcome with the mounting of the present invention.

Indeed, it is contemplated that for the mounting disclosed by U.S. Pat. No. 6,105,540, it is required that the "U" profile being formed with the metal sheet ring should be symmetric as, otherwise, the pressure over the inside surface of the carrier hoop will avoid a correct positioning.

Also contemplated as a limit to this background is the condition that the walls of the channel defining the metal sheet ring should always keep a compressive stress. If this condition is not met before and during the welding process, such process may be affected.

Again, the limitation is contemplated that establishing the condition that both fins of the "U" profile of the metal sheet ring should constitute an angle less than 45° with respect to the plane of the inside surface of the carrier hoop supporting them.

Also noted is the limitation that the inside surface(s) of the carrier hoop should not generate a truncated cone seat for the ends of the fins of the "U" profile that forms the metal sheet ring.

Especially noted is that the carrier hoop should not present pairs of inside radial surfaces defining seat steps for the free ends of the fins of the metal sheet "U" profile due to the fact that the difference of the diameters between the free ends of the fins and the inside surfaces of the support hoop should be at a minimum. If the seat steps are not present, the welding of the fins is carried out without support, which is not certainly secure.

Especially noted is that, whenever an assembly is carried out as the one achieved with the mounting disclosed by U.S. Pat. No. 6,105,540, the welding bead that fixes the assembly will not have a stable backing, because the supports of the free ends of the fins of the "U" profile of the metal sheet ring have a reduced surface. In this case, welding may be carried out only with a great material supply.

Accordingly, any alteration to the established compressive stress that may be caused by the temperature variation directly affects the welding bead.

According to this prior art, there exists some background that discloses processes for the manufacturing of these metal sheet rings.

Japanese Patent JP-A-5-231539 is part of this background art, disclosing a structure including a metal sheet ring of a cross section in "U"-shape and a molded support hoop that are coupled by the welding of the ends of the metal sheet ring and the inside part of the support hoop.

This document discloses that the metal sheet ring is created by rotating the metal sheet having the same thermal expansion coefficient as the material of the piston body.

Indeed, as is also disclosed by U.S. Pat. No. 5,903,974 to Kenji Nakajima, these are metal sheet rings of a "U" cross section that have up to now been manufactured from stainless steel sheets of 18 mm width, 290 mm length and 0.6 mm thickness, for example, which are curved using roll manufacturing machines. Once curved, these sheets are placed on a template of circular cross section and welded at their free ends to constitute circular rings. By means of these rotating manufacturing machines, these rings acquire a "U" cross section.

As a complement to what previously disclosed, the Japanese patent application JP-A-6-210383 states: A cylindrical sheet, obtained by welding the free ends of a curved sheet, is wound in a roll manufacturing machine to adopt the form of a circular collar of "U" section. Then, the collar is arranged in a rotating machine to get a predetermined dimension for the inside diameter of the hoop. In a further step, the sheet having a ring-shape passes through a machine that will remove the roughness from the edges of the circular collar ends that were formed during this process.

U.S. Pat. No. 5,903,974 also discloses that, as a conventional technique for the manufacturing of these sheet metal rings, use is made of three different machines: a roll, a rotating device and a cutting down device (a polishing device for the purpose of removing surface roughness or irregularities). These machines are not assembled but rather are placed one after another, occupying a big space. This represents a high cost of installation. This patent states that, with the conventional technique, no metal sheet rings can be effectively produced.

The novelty disclosed by U.S. Pat. No. 5,903,974 is a machine to produce these metal sheet rings that performs the step of placing a cylindrical hoop into a receiver slot, such that, while a die rotates with the cylindrical hoop in a movable position, a roll presses on the hoop forming the collars that confers the "U" section format to the hoop. Then each ring, so preformed, is arranged such that a cutting machine acts over the free edges, while the die supporting it rotates, making the edges smooth, that is, removing the folds and the rough edges that may exist.

Also contemplated is a machine or process specially designed to make rings of "U" profile with straight fins. In case another profile design or cross section is required, another construction die specially designed for each case is introduced, thus considerably increasing the manufacturing costs.

Also contemplated in each case, are processes that combine rotating dies with a pressure roll, changing a cylindrical ring into a ring of "U" profile.

Also contemplated is that all these specifications refer to cylindrical rings constituted from curved sheets that are then welded by their free ends.

Invention Novelty—Main Object

As was previously mentioned, the mounting referred to herein is applicable to an aluminum alloy piston for internal combustion engines, of the type having a top circular head (piston head) and a cylindrical wall extending downwards from said head. In this case, the head also includes a metal insert defining the annular cooling tube, arranged within the head, constituted by a radially extending carrier hoop, coaxial with the shaft of the piston body and supporting a metal sheet ring of cross section similar to a "U" that is assembled and welded to the carrier hoop.

The present invention relates to a mounting that is used for the binding and assembly of the metal sheet ring on the carrier hoop, the assembly making sure that the ring is kept duly positioned and fixed on the carrier hoop before the welding is carried out, not requiring the use of stress due to differences of thermal expansion, and providing a highly convenient and secure backing to the welding bead.

A first feature that makes the present invention stand out from all those that are presently already known is that the carrier hoop provides for the seat of each of the annular edges of the metal sheet ring a surface support that is defined in a diametrical plane and also a surface support that is defined in an axial plane. Both surfaces of support are inside surfaces of the carrier hoop, and they constitute an angle with each other, with their diameters greater than the diameter of the inside surface of the same hoop between the seats.

From this constructive principle, the invention contemplates that the referred to seats may present an oblique orientation for those cases wherein the required metal sheet ring has fins constituting a truncated cone (without restriction as to the angle setting).

Accordingly, these surfaces, defining the seats of the metal sheet ring, are arranged separated from each other by a surface on the inside of the hoop, thus constituting one of the inside surfaces of the cooling tube being formed.

From the above, it is clear that a double support seat is created to support to the welding bead as a part of the benefit thereof.

This advantage is possible due to the novelty constructive solution established for the mounting of the metal sheet ring on the carrier hoop. Indeed, in order to carry out the adequate and stable mounting, the ring is presented and positioned in the carrier hoop body without its final format.

In some of the embodiments of the present invention, a preformed ring is created wherein one of the fins of a generally "U" cross section is open at an angle larger than the other one. Under these circumstances, the diameter of the free end of one of the fins is, at least, similar to the diameter of the inside surface of the carrier hoop where said fin stops, while the diameter of the free end of the other fin is substantially less than the diameter of the inside surface of the carrier hoop where it stops.

Under these circumstances, when the preformed ring is positioned, one of the fins thereof will be arranged in its seat, while the other one will be slightly separated from its seat, having a smaller diameter than the seat. By using an adequate tool, a compression action will be made on the ring to make said other fin open, until said other fin locates in the corresponding seat of the carrier hoop and stops.

Tests already carried out show that, as mentioned, this mounting is highly effective, as the metal sheet ring keeps positioned, without stress, and stable such that the welding process may be carried out. An ideal positioning is achieved without generating thermal expansions, and no undesirable stress is caused when coupling. It is a clearly mechanical assembly.

It is particularly noted that the inventive mounting allows that the profile or cross section of the metal sheet ring to respond to different designs and dimensions, due to the fact that, by introducing the constructive condition of generating the ring preform in the above mentioned way to allow the coupling to the carrier hoop, it will always be possible to carry out the mounting under desirable conditions for the further and final welding process.

It is contemplated that mounting of the present invention allows the mounting of metal sheet rings of "U" section or equivalent, wherein the fins of the "U" form an acute angle with the cross web connecting them, that is, wherein they are convergent fins It is also noted that this invention allows the mounting of metal sheet rings where one of the fins is longer than the other one in such a way that the width of the cooling tube being formed is greater than the height or thickness of the carrier hoop.

It is also noted that, as a consequence of the inventive mounting, the seats being defined by the carrier hoop to support the free ends of the fins may be parallel or oblique to the horizontal plane of the assembly, that is to say, they may be truncated cone seats.

It is also noted that, as a consequence of the inventive mounting, "U" section metal sheets or equivalents are possible to be defined with the fins thereof having different curvature degrees with different ratios and angles.

It is also noted that, as a consequence of the inventive mounting, "U" section metal sheets or equivalents may be designed such that the cooling tube is arranged disaligned with respect to the symmetry axis of the carrier hoop.

It is also contemplated that the double support of the sheet fins constitutes a highly secure backing for any type of welding, with or without a third material supply.

Accordingly, the present invention involves mounting a metal sheet ring on a carrier hoop to form an annular cooling tube of a piston of an internal combustion engine, wherein the mounting consists of a metal sheet ring, which cross section comprises a web extending between two fins projecting towards the carrier hoop such that the free ends thereof rest and couple to annular seats defined in the inside face of the carrier hoop, wherein the couplings are sealed by respective annular welding beads extending along the annular seats to form an inside annular cooling tube, the inside surface of which is constituted by the metal sheet ring and the inside diametrical surface of the carrier hoop extending between the two annular seats.

The invention contemplates that the fins of the metal sheet ring can be oriented in convergent directions towards the carrier hoop.

It is also contemplated that the fins of the metal sheet ring can be oriented perpendicular to the carrier hoop.

It is also contemplated that the body of the carrier hoop can be of a truncated cone cross section, and that the fins of the metal sheet ring can be oriented in convergent directions towards the respective annular seats of the carrier hoop.

It is also contemplated that one of the fins of the metal sheet can be oriented perpendicular to the carrier hoop body and that the other fin follows a curved line and then reaches a final straight path extending up to the seat, the final straight path being in a cross direction to the carrier hoop. It is furthermore contemplated that both fins of the metal sheet can be curved, with the end paths thereof oriented in cross directions towards the carrier hoop.

On the other side, it is contemplated that the height of the metal sheet ring may be higher than the height of the carrier hoop.

It is also contemplated that the annular welding beads that rest on the carrier hoop are defined on the annular seats of the hoop, confined in a double backing support.

Furthermore, for the coupling of the metal sheet ring to the carrier hoop, the ring previously presents one of its fins with an angle greater than the other one, in such a way that the diameter of its free end is less than the diameter of the free end of the other fin, while, after the coupling, this fin is pressed against the carrier hoop body, adopting its final position and format.

It is also contemplated that for the coupling of the metal sheet ring to the carrier hoop, the diameter of the free end of one of the fins is less than the internal diameter of the carrier hoop.

Furthermore, the method of manufacturing the fin metal sheet ring referred to herein is clearly distinguished from all the others currently known, because no expensive machines are required due to the fact that the ring is constituted by using known and conventional dies and tools.

The need for using equipment to rotate the piece being formed, together with forming rolls, thus requiring high costs for machinery, fittings and labor is eliminated.

The need of cylindrical rings constituted by curved sheets having ends attached by welding is eliminated. By avoiding the welding, possible damage or faults due to bad welding is also avoided.

To constitute the inventive ring, a flat metal sheet commercially available in the market is used.

This has the advantage of enabling the selection, without any inconvenience, of sheets of different thicknesses to achieve the desirable thickness for forming the wall of a channel of "C" shape.

It is also possible to select different types of materials, as for example different qualities of stainless steel and/or carbon steels.

The inventive process allows adjusting the profile design of the ring in accordance with the need to establish the final design of the cooling channel being formed.

No previous welding is required for the ring manufacturing, thus eliminating from the beginning the possibility of welding faults.

It is contemplated that this is a fully novel performance, as a stamping method from a flat metal sheet, preferably circular, is used.

Accordingly, the present invention relates to a method of mounting a metal sheet ring on a carrier hoop to form an annular cooling tube of a piston of an internal combustion engine that comprises the following steps: take a flat metal sheet of a desired thickness, and cut it creating a circular disk; produce, by stamping on the disk, a circumferential wall having a folded edge of a diverging fin; cut and remove the circular bottom, by stamping the piece being constituted in the previous step; take the ring constituted in the previous step and form a second folded edge of a diverging fin by stamping the circular edge opposite to the one already existing in the first diverging fin; place the fin ring produced in the previous step in a rotating support and submit the ring to a final calibration by means of cutting tools that act on the circumferential edges of both fins.

It is also contemplated that the stamping dies comprise a support piece and a stamping tool having cooperating active surfaces that lock the metal piece being acted on, and present peripheral paths having structures that correspond to the foreseen design for the metal sheet ring being formed.

It should be noted that the cutting action produced on the metal sheet in the first step is carried out by a circular cut-die by stamping.

The present invention also relates to a fin ring of sheet metal, obtained by means of the described method, that consists of a sole body of sheet metal having a cross section of a "C" profile having diverging fins that respond to different pre-established designs.

It is also noted that the different pre-established designs for the diverging fins of the metal sheet ring may have different orientations, curvatures and dimensions.

BRIEF DESCRIPTION OF THE FIGURES

In order to complete the above mentioned advantages, it will be apparent for users and those skilled in the art that many other ones may be added in order to facilitate the understanding of the constructive, constitutive and functional features of the inventive mounting, a preferred embodiment of which is described below, which is schematically illustrated with no specified scale, in the enclosed figures, and which, as just an example, does not limit the scope of the present invention, but only helps as an illustration of the basic principles thereof.

It should be noted that, in each figure, the same referential numbers and letters correspond to the same or equivalent constitutive parts or elements, according to the example selected for the present explanation of the inventive manufacturing method.

DETAILED DESCRIPTION OF A SELECTED EXAMPLE

Figure 1:
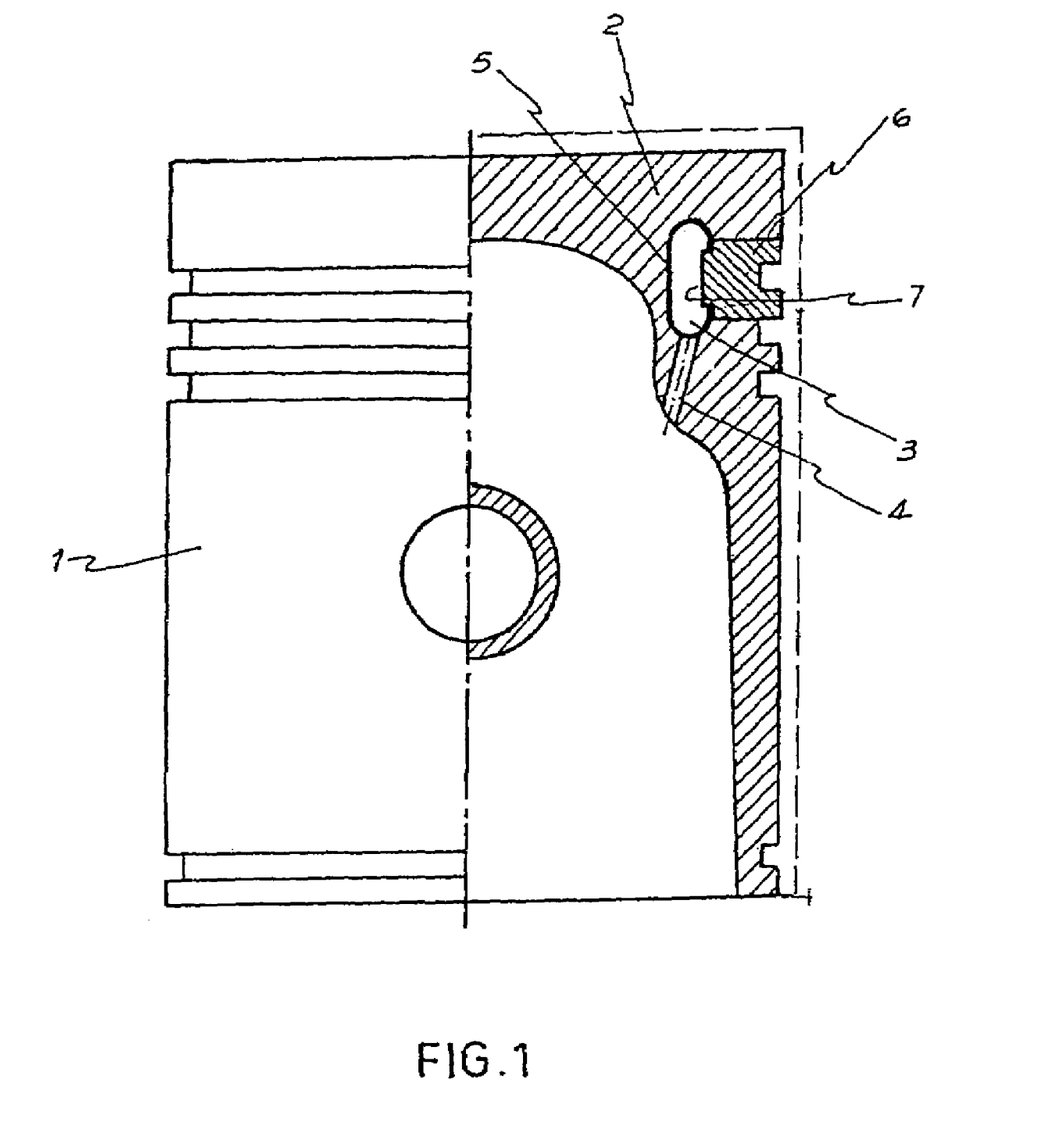
FIG. 1 is a front elevation, with half in vertical section, of the body of a piston of an internal combustion engine.

As can be appreciated from FIG. 1, the mounting referred to in connection with the present invention is intended to be applied to a piston 1 used by an internal combustion engine.

As is well known, the piston, together with the rings (not illustrated), should effectively seal the combustion chamber to avoid the entrance of hot gas and lubricant oil in any work condition. On the other side, it is already known that portion 2, usually called the piston head, is more exposed to the thermal and mechanical requirements. Therefore, there currently exist various pistons that include a cooling gallery or tube 3 arranged in the body of the head 2.

The purpose of the cooling gallery or tube 3 is to counteract the heating in the piston head 2 when the temperature is excessive. Thus, a cooling liquid, such as the engine oil, circulates through the cooling tube 3 that, by passing through passages 4 (one of which is shown), communicates with the inside of the piston. That is to say, a certain amount of the lubricant oil itself stirring with the piston movement, also enters into the internal cooling tube 3, thereby absorbing the heat of the inside of the body of the head 2.

Normally, the piston body is of an aluminum constitution and is manufactured by casting, while the mentioned cooling tube 3 is formed with a metal sheet ring 5 welded to a carrier hoop 6 that is usually cast iron, with nickel and copper. The cooling tube 3 is placed into the constitution die, prior to tapping, such that it is kept inside the piston body. Under these circumstances, the piston integrity and its structure are kept.

As is contemplated in FIG. 1, the cooling tube 3 is an annular tube having walls constituted by the metal sheet ring 5 and the internal radial surface 7 of the carrier hoop 6.

By the present invention, a mounting has been created such that the constitution of the cooling tube 3, by the welding union of the metal sheet ring 5 with its carrier hoop 6, may be effective, may be of low cost, and above all, may make sure that aluminum does not enter during all of the process of piston tapping.

Preferably, the set of pieces constituting the mounting of this invention has the same expansion coefficient as the aluminum.

Indeed, as is shown in FIGS. 2 through 6, the mounting achieved is prominent as the carrier hoop 6 presents two annular seats 8 and 9 matching its inside face. These annular seats are similar, opposite and symmetric to each other, and they are separated from each other by an annular surface of the same carrier defining the inside radial surface 7 of the annular cooling tube 3.

The presence of the seats 8 and 9 provides interesting results, as in each of them, a double support is established for the free ends of the fins 10 and 11 of the folded metal sheet ring 5. One of the supports is the annular surface in a diametrical direction, and the other one is the annular surface in the axial direction.

In this way, what is achieved is that welding, establishing the union of both pieces 5 and 6, provides an hermetic closure that prevents the entrance of aluminum into the annular cooling tube 3 and the exit of hot gas from the inside of the tube 3 towards liquid aluminum poured into the mold, as these effects cause the rejection of the piston that is being constituted.

As it is shown in FIGS. 2 through 6, the mentioned double support for each annular seat 8 and 9 is prominent due to the fact that the annular seats make sure the welding will be supported on the carrier hoop, which is highly advantageous for the ability to resist any type of mechanical forces, as well as the stresses that generate whenever temperature changes occur. That is to say, the welding bead 1—always acts as a seal, and the body of the carrier hoop provides the mechanical resistance.

What is established in the previous paragraph is highly notable due to the fact that there exist many cases wherein the free ends of the fins of the ring 5 rest upon axial surfaces of the carrier hoop 6, constituting linear supports, such that the welding bead is also the closure backing, and therefore the seal being constituted should be well achieved, as otherwise any relative movement produced by the behavior of the materials due to high temperatures may generate cracks.

In FIGS. 2-6 different design options are shown that respond to the constructive principle indicated in the two previous paragraphs and, in turn, each of them adapts to different constitution criteria for the cooling tubes 3 that are required by the suppliers. These figures show that the inventive mounting allows different designs of cooling tube 3. Accordingly, it is applicable to different market requirements.

Figure 2:
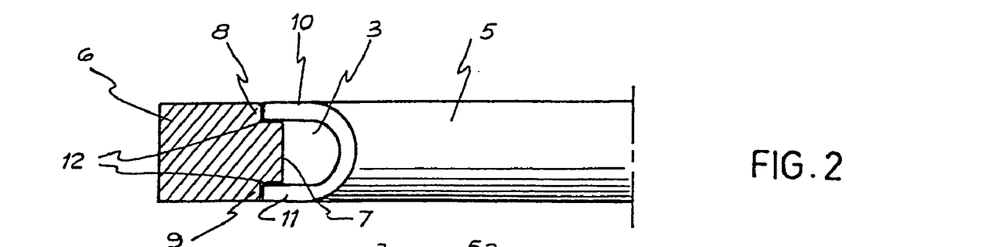
FIG. 2 is a cross sectional view of one side of a first embodiment of the inventive mounting, showing the case wherein the fins of the metal sheet ring are straight and parallel to each other.

The case represented by FIG. 2, shows that the metal sheet ring 5 is of "U" section, with straight fins perpendicular to the carrier hoop body 6, so that the free ends of fins 10 and 11 rest and stop at the mentioned seats 8 and 9 provided by the carrier hoop 6.

Figure 3:
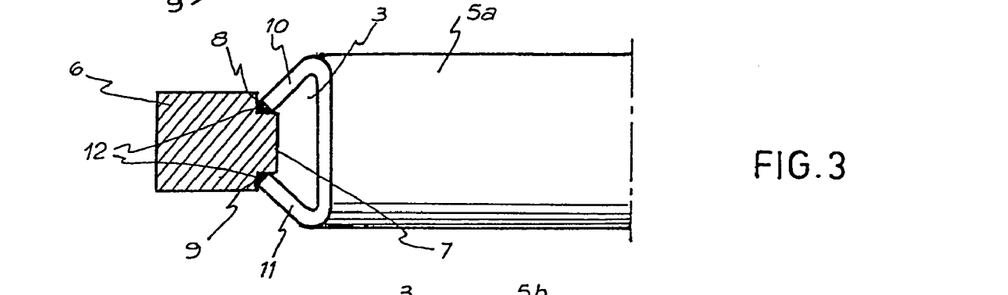
FIG. 3 is a cross sectional view of one side of a second embodiment of the inventive mounting, showing the case wherein the fins of the metal sheet ring are convergent.

FIG. 3 shows that the metal sheet ring 5a, in this case, has fins 10 and 11 in convergent direction towards the carrier hoop body, so that the cooling tube 3 being constituted is of a trapezoidal cross section.

Figure 4:
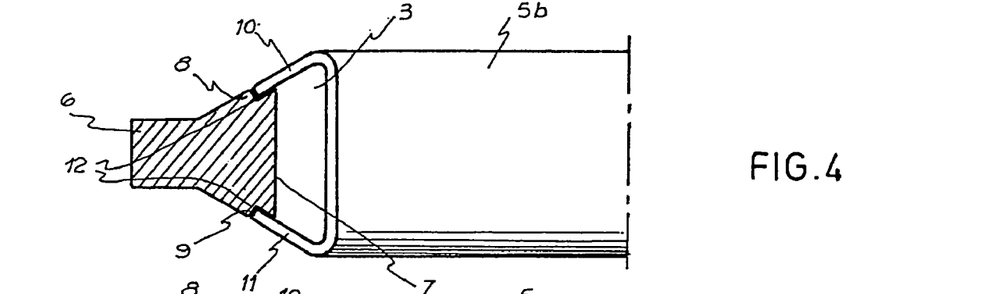
FIG. 4 is a cross sectional view of one side of a third embodiment of the inventive mounting, showing the case wherein the body of the carrier hoop presents obliquely oriented seats (truncated cone construction) due to the fact that the fins of the metal sheet ring are convergent towards the seats.

FIG. 4 shows that the metal sheet ring 5b, in this case, rests on a carrier hoop 6 of truncated cone cross section. Accordingly, the annular seats 8 and 9 thereof are oriented in diverging directions, such that the cooling tube 3 being constituted is also of a trapezoidal cross section and of a greater height than the mentioned carrier hoop 6.

Figure 5:
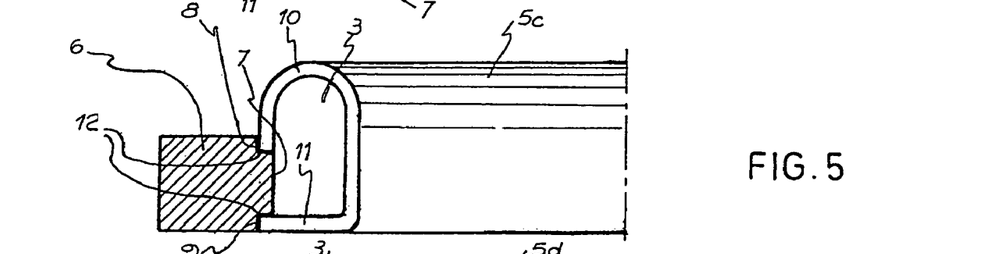
FIG. 5 is a cross sectional view of one side of a fourth embodiment of the inventive mounting, showing the case wherein the cooling tube conforming the metal sheet ring is of a height greater than the height of the body of the carrier hoop and the tube is arranged disaligned with respect to the symmetry axis of the carrier hoop.

FIG. 5 shows another variant of the design of the internal cooling tube 3 that is possible to be achieved with the inventive mounting. In this case, the fin 11 of the ring 5c is straight and is oriented perpendicular to the seat 9 of the carrier hoop 6, while the fin 10 starts in a curved path and finishes perpendicular to the diametrical surface of both surfaces constituting the seat 8. In this case, a cooling tube 3 is also constituted which has a greater height than the carrier hoop 6.

Figure 6:
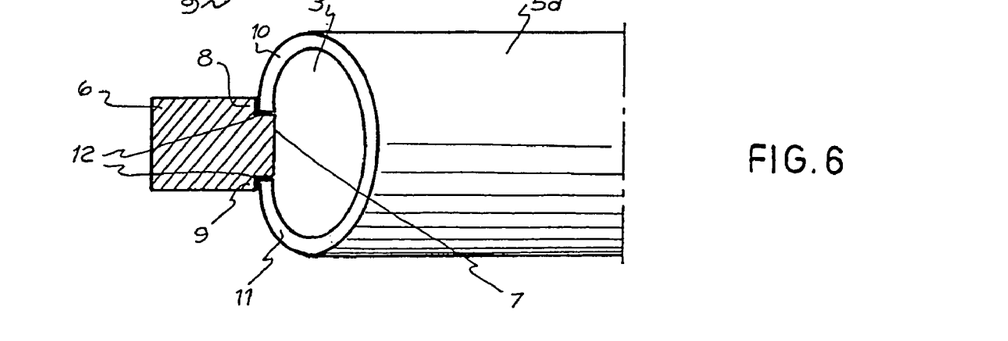
FIG. 6 is a cross sectional view of one side of a fifth embodiment of the inventive mounting, showing the case wherein the fins of the metal sheet ring are curved.

FIG. 6 shows another variant of the design of the internal cooling tube 3 that is possible to be achieved with the inventive mounting. In this case, the mentioned fins 10 and 11 of the ring 5d extend along respective curves that finish in convergent lines oriented perpendicular to the diametrical surface of both surfaces constituting the supports 8 and 9 of the carrier hoop 6.

Now turning to FIGS. 7 through 11, it is possible to understand the constructive solution reached to create the inventive mounting in a simple, quick, low operative cost and secure way.

Figure 7:
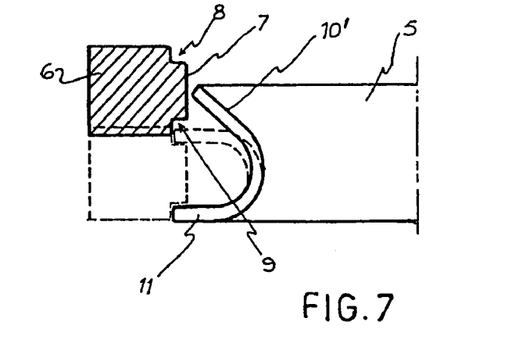
FIG. 7 is a vertical section showing the metal sheet ring of FIG. 2 as a preform for positioning into the carrier hoop, before the final assembly, the diameters of the free ends of the fins being different from each other.
Figure 8:
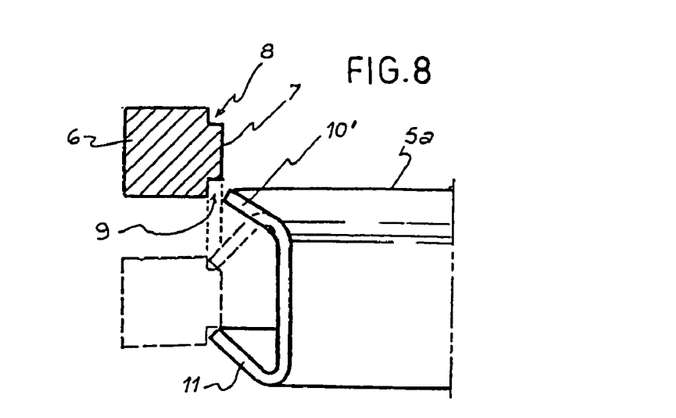
FIG. 8 is a vertical section, similar to the one of the previous figure, showing the metal sheet ring of FIG. 3 as a preform for positioning into the carrier hoop, before the final assembly, the diameters of the free ends of the fins being different from each other.
Figure 9:
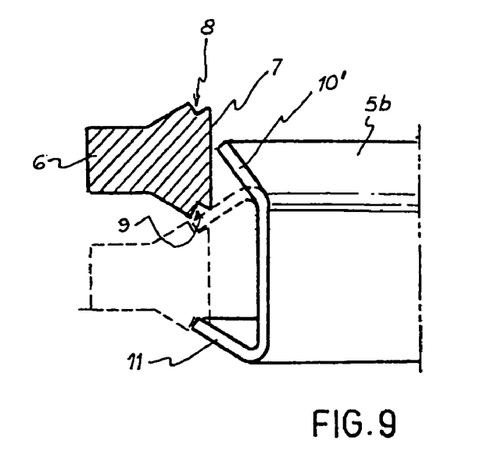
FIG. 9 is a vertical section, similar to the one of the previous figure, wherein the seats of the carrier body are oblique and oriented in diverging direction, and the metal sheet ring of FIG. 4 is arranged as a preform for positioning into the carrier hoop, the diameters of the free ends of the fins being different from each other.
Figure 10:
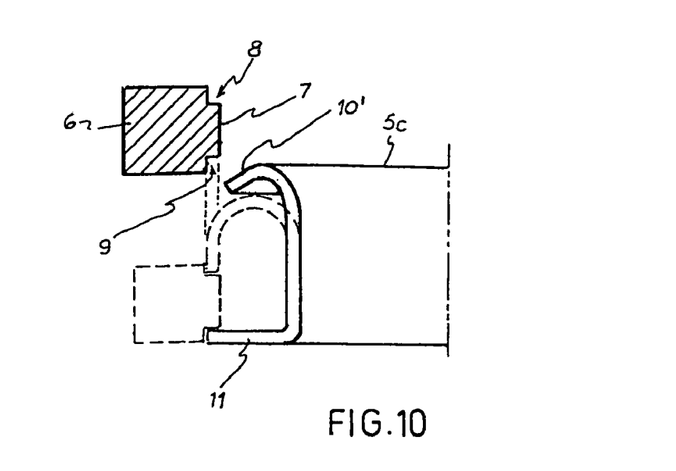
FIG. 10 is a vertical section, similar to the one of the previous figure, showing the metal sheet ring of FIG. 5 as a preform for positioning into the carrier hoop, the diameters of the free ends of the fins being different from each other.
Figure 11:
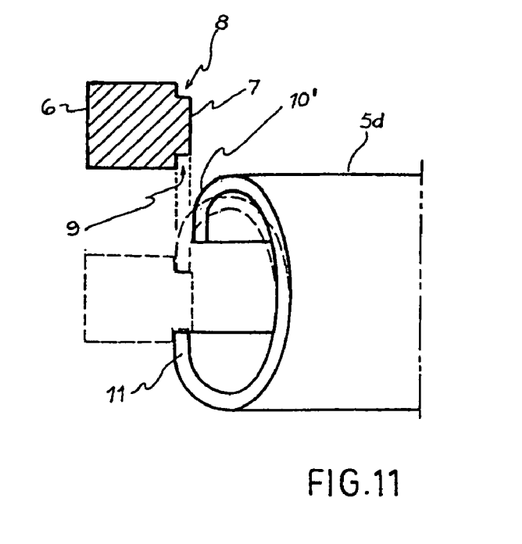
FIG. 11 is a vertical section, similar to the one of the previous figure, showing a metal sheet ring of "alveolar" profile (continuous curve), such as the one of FIG. 6, as a preform for positioning into the carrier hoop, the diameters of the free ends of the fins being different from each other.

Now turning to the section shown in FIG. 7, it is possible to understand that the diameter that determines the free end of the fin 10' is smaller than the diameter determining the free end of fin 11 and that the curvature angle with respect to the main web from which the fin 10' is projecting is larger than the curvature angle from which the fin 11 is projecting.

It is then a preformed metal sheet ring 5 wherein the extension of the fin 10' in the radial direction of the metal sheet ring is less than the extension of the 11 in the radial direction of the metal sheet ring, this constructive condition being highly useful to produce the coupling of the support hoop 6 to this metal sheet ring 5.

Indeed, now turning also to FIGS. 7-11, it will also be understood that the dimensional relation explained in the two previous paragraphs allows ring 5 to enter the carrier hoop 6 to face the inside annular face of the carrier hoop 6. This is due to the fact that the diameter of the free end of fin 10' is always slightly less than the diameter of the radial surface 7 that, pertaining to the support hoop 6, extends between seats 8 and 9.

This simple constructive solution resolves, in a highly effective way, the coupling of pieces 5 and 6.

Figure 12:
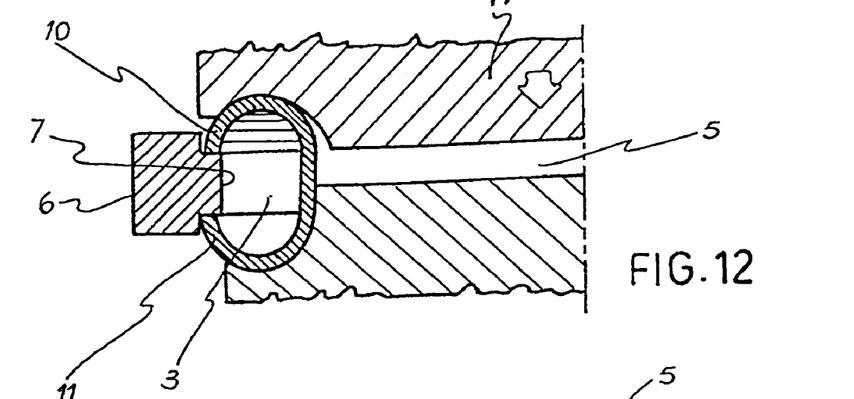
FIG. 12 is a vertical section showing the way that the final positioning of the pieces constituting the cooling tube is carried out, being mounted according to the present invention.

FIG. 12 shows that, once the ring 5 and the carrier hoop 6 are coupled, only the final stamping on fin 10 will be required to be carried out. Fin 11 stays positioned, having its free end resting on seat 9, while tool H places pressure on fin 10 causing its free end to be properly positioned on the annular seat 8.

FIG. 12 shows that the metal sheet ring 5 keeps very well positioned and stable on the carrier hoop 6, bringing a final constitution to the annular cooling tube 3, fins 10 and 11 being without stress.

Figure 13:
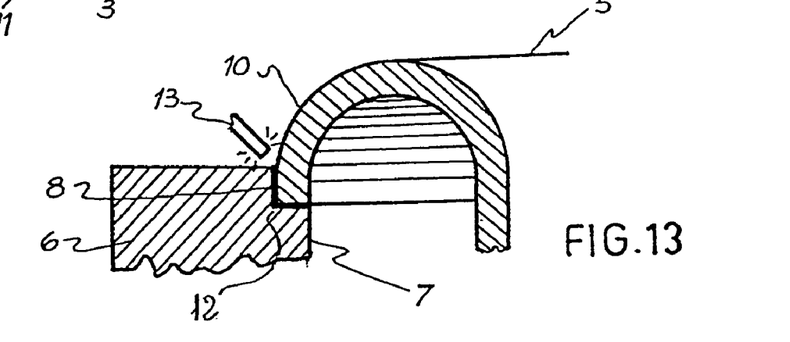
FIG. 13 is a vertical section scheme showing the way that the welding process on the already positioned pieces is carried out.

The enlarged detail represented by FIG. 13 is, precisely, to show the way that a welding process 13 establishing the final union between the pieces 5 and 6 is carried out.

Figure 14:
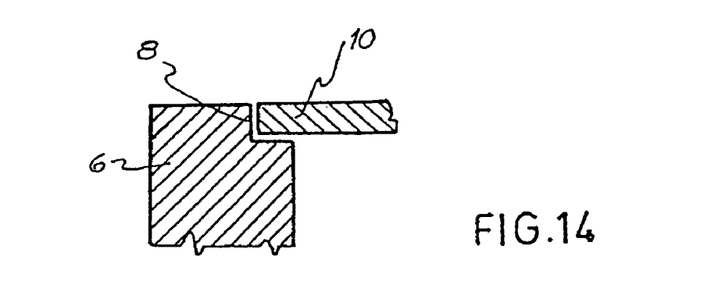
FIG. 14 is an enlarged detail, in vertical section, showing the carrying out of the coupling of the edge of free end of a fin of the metal sheet ring on the corresponding assembly seat defining the carrier hoop, so that the welding process may be carried out.
Figure 15:
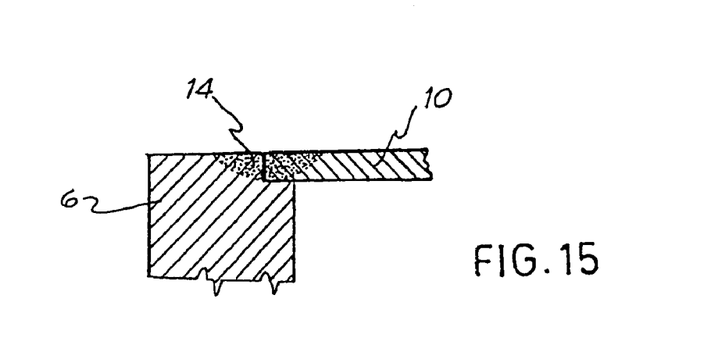
FIG. 15 is an enlarged detail, in vertical section, similar to the one of the previous figure, in this case showing the constitution of the annular welding bead binding both pieces in a fixed and secure way.

Indeed, as it is shown in the enlarged details of FIGS. 14 and 15, what makes this mounting different from the other ones currently known, is that the body of the carrier hoop is used as a support for the welding bead 14, such condition making sure that the mounting is highly stable and secure.

In this preferred example, a welding bead 14 (FIG. 15) is shown, said bead being made by a gas embedded voltaic arc. Thus, a bead 14 is generated, constituted by the free end of fin 10 and a portion of the carrier hoop 6 that comprises the annular seat 8 (FIG. 14). It is an annular seal constituted by the materials provided by the coupled surfaces, and also a third material may be included if required.

This type of coupling also allows the use of other types of welding, such as electronic beam, high frequency, microplasma, etc., in each case with or without material supply.

Figure 16:
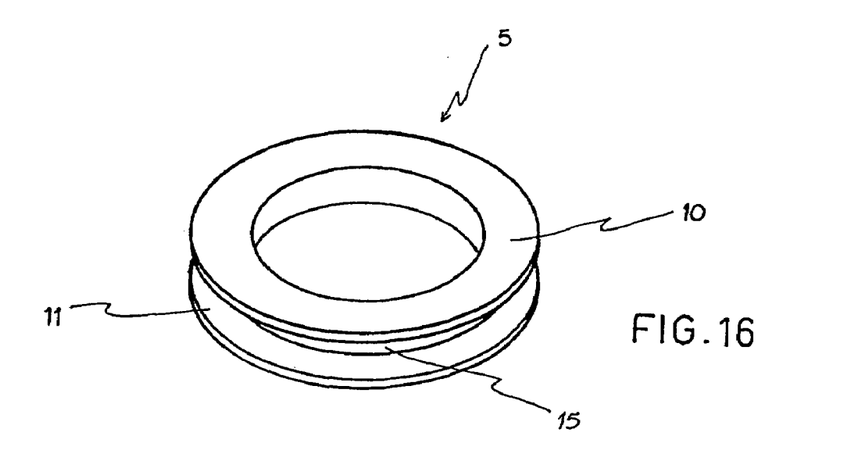
FIG. 16 is a perspective view showing a finned metal sheet ring that may be formed by the method herein.

The manufacturing method referred to herein has been created to constitute the fin ring 5 that is represented in FIG. 16. It is a metal sheet ring, like those previously explained to describe the invented mounting.

Now, in order to explain in detail the invented method for the manufacturing of the ring, the ring is described as a ring that comprises a web 15 from which respective fins 10 and 11 project to form an annular channel having a dimension and format that define the basic structure that the annular cooling tube constituted therefrom should have.

Figure 17:
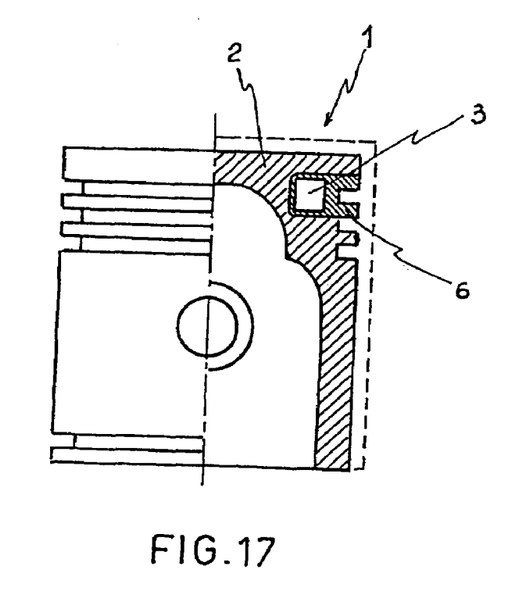
FIG. 17 is a front elevation, with half in vertical section, of the body of a piston of an internal combustion engine.

FIG. 17 shows the scheme of a piston 1 for an internal combustion engine. Such a piston, which is generally made of aluminum and manufactured by casting, includes an annular cooling tube 3 extending to match the top part 2 of the piston.

As was previously indicated, the purpose of these annular cooling tubes is to counteract the heating of the top zone of the piston when the temperature is excessive. Thus, a cooling liquid circulates through the tube, such as the lubricant oil stirring with the piston movement.

Figure 18:
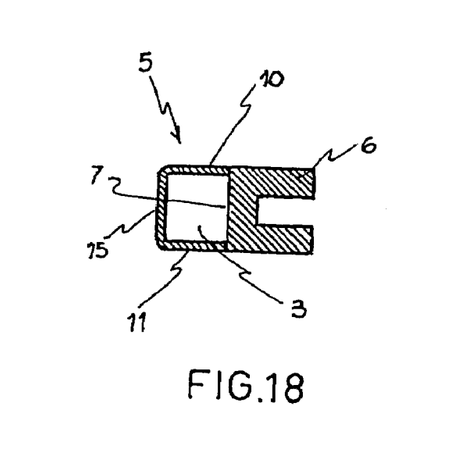
FIG. 18 is a cross sectional detail showing an insert to be introduced to the piston body to constitute the annular cooling tube.

The section represented in FIG. 18 shows the way that annular cooling tubes 3 are constituted according to prior disclosures and also according to embodiments currently existing in the market. A fin metal sheet ring 5 attached to a support hoop 6 may be appreciated.

FIG. 18 clearly shows the annular cooling tube being defined by the inside surface 7 of the carrier hoop, the fins 10 and 11 and the web 15 of the metal sheet ring 5.

It is an object of this invention to provide a novel method for the construction of the referred to fin metal sheet ring 5 to be then attached, by welding, to the carrier hoop 6 to constitute an annular cooling tube capable of being effective in the inside of the piston body.

In this preferred example, the fin ring 5 corresponds to a pattern having a "U" cross section with straight and parallel branches. However, it is noted that the inventive manufacturing method is created to form other fin rings of variable formats and designs. As appears from the functional explanation below, it will only be required to change the stamping dies.

FIGS. 19 through 22 represent the steps of the process to create the ring 5 with straight and parallel branches to each other.

Figure 19:
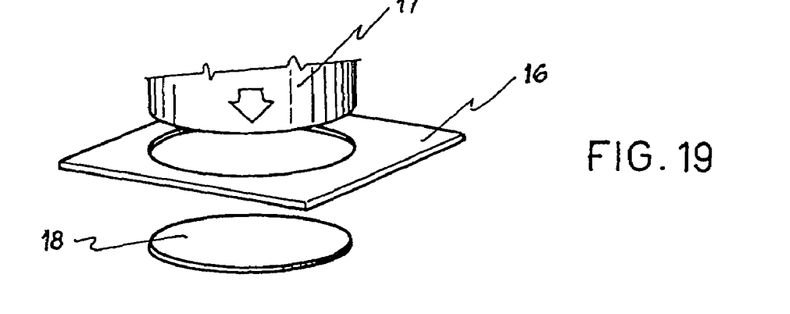
FIG. 19 is a schematic view showing the first step to form the finned metal sheet ring according to the present invention, wherein the cross section of the fin ring being formed is like a "U" with straight branches.

FIG. 19 shows that the first step consists of stamping in a die a flat metal sheet 16 by means of a cut tool 17, a flat disk plate 18 being obtained from which the ring 5 will be formed.

This first constitution step is highly important for the construction of these metal sheet rings, because it starts as a flat metal disk that is easy to manufacture and low in cost.

Indeed, in most cases, annular cooling tubes start from a cylindrical ring constituted by a folded metal sheet whose ends are attached by welding. Instead, with this inventive method, a way was found to avoid the ring being constituted by a welding union. A sole annular body is obtained without welding, which is highly important for the behavior required of these pieces.

Figure 20:
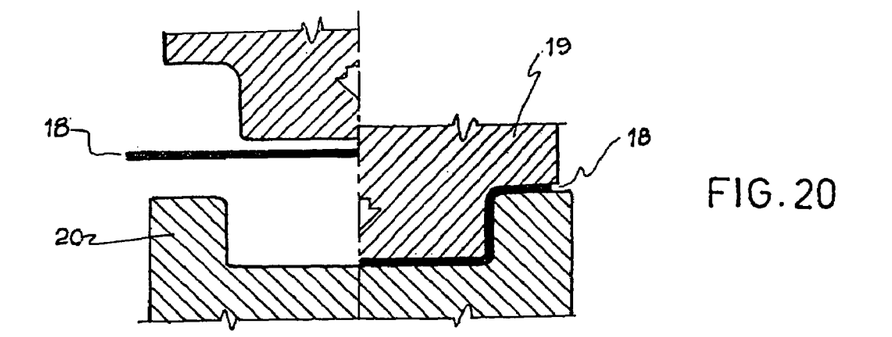
FIG. 20 is a schematic vertical section showing a step to form the fin ring that is subsequent to the step represented in the previous figure.

FIG. 20 shows that the second constitution step is a first constitution stamping or a deep stamping. Disk 18 constituted in the previous step is mounted and, by dies 19 and 20, the first annular fold is produced, wherein die 19 presents a design that contemplates the creation of fins.

Figure 21:
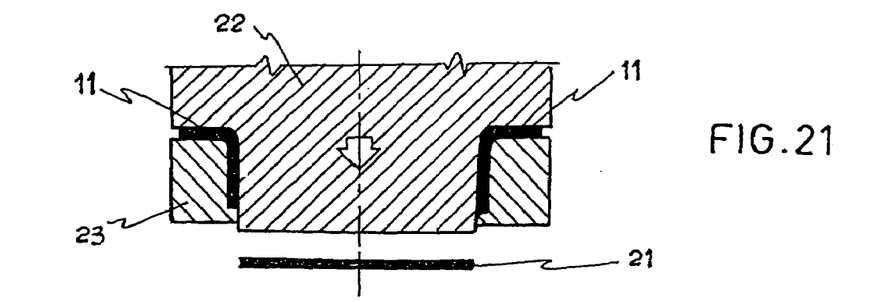
FIG. 21 is a schematic vertical section showing another step of forming the fin ring that is subsequent to the step represented in the previous figure.

FIG. 21 shows that a third constitution step consists of constituting a metal sheet ring by means of cutting and removing the circular bottom 21 presented in the piece treated in the previous step. A cut-die 22 and the corresponding support 23 are used. At the same time, due to a cooperating action of these dies, the fin 11 of the ring being formed is born.

Figure 22:
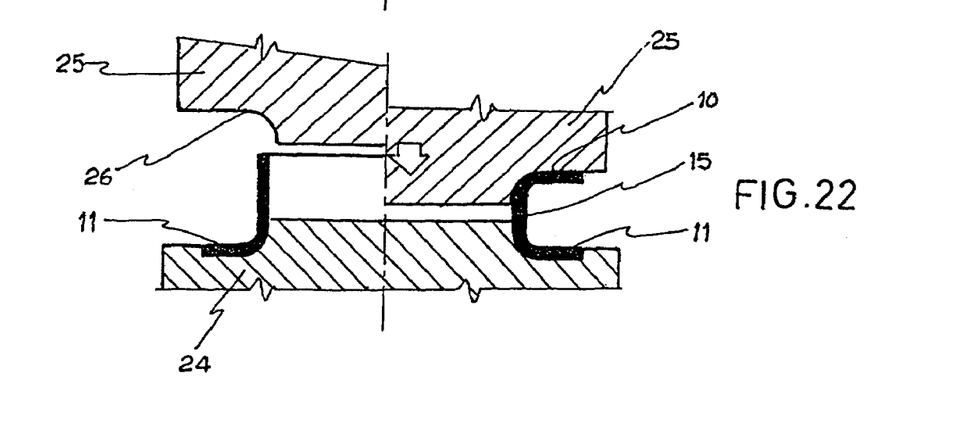
FIG. 22 is a schematic vertical section showing another step of forming the fin ring that is subsequent to the step represented in the previous figure.

FIG. 22 shows a further step wherein the ring being formed in the previous step is reversed and placed in a base support 24 provided from a seat that corresponds to the final format and dimension of the annular fin 11, while the fin 10 is formed by stamping using the tool 25 that, as is shown in this figure, includes an active path 26 specially designed to provide a desired constitution of the fin 10.

At this point, it is possible to contemplate other advantages of the claimed method, such as the fact that by changing the design of the active surface of the cut-die 22 matching the path generating the fold that allows fin 11 to be born, another format, orientation or dimension for each fin may be designed.

The same occurs to the stamping die 25 that is shown in FIG. 22, wherein the mentioned active surface 26 will have a design according to the dimension, orientation or transition curvature angle established by the manufacturer with respect to the design of the cooling channel that is going to be produced.

It should be understood, according to what was stated in the previous two paragraphs, that it will be enough to have sets of dies according to the different annular cooling tubes being required by clients, to produce all the existing designs in the market; whenever all the steps established in this novel method are followed, starting from a metal sheet flat disk.

Just to illustrate what was said in the previous paragraph, FIGS. 23-27 are included to show how the inventive method allows the formation of a metal sheet ring whose profile corresponds to a "C" of curved fins.

Figure 23:
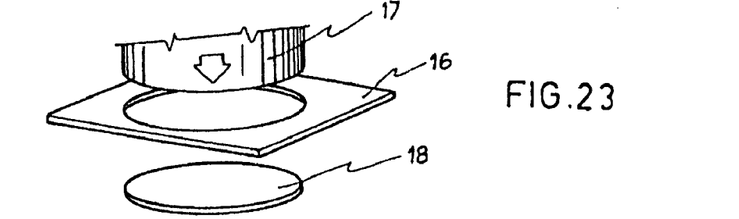
FIG. 23 is a schematic view showing the first step to form the finned metal sheet ring, according to the present invention, wherein the cross section of the fin ring being formed is like a "U" having curved branches.

FIG. 23 shows that the first constitution step is the same as in FIG. 19.

Figure 24:
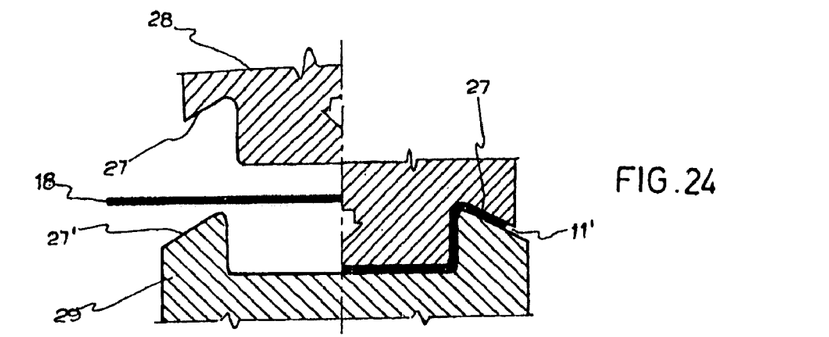
FIG. 24 is a schematic vertical section scheme showing a step to form the fin ring that is subsequent to the step represented in the previous figure.
Figure 25:
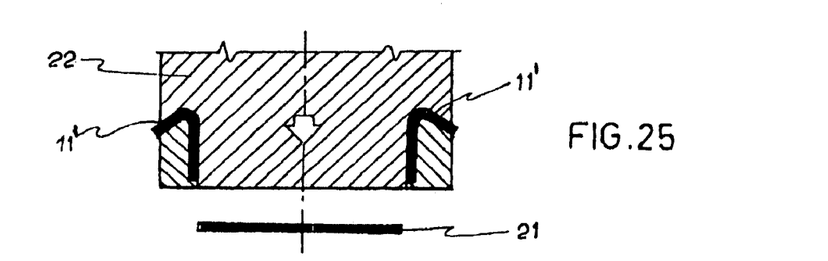
FIG. 25 is a schematic vertical section showing a step to form the finned metal sheet ring that is subsequent to the step represented in the previous figure.

Once the metal disk 18 is obtained, the second formation step starts, represented in FIG. 24, wherein the stamping die 28 presents an annular path 27 of its active surface that corresponds to a foreseen pattern to produce a preform with a fin 11' that is different from what it will be ultimately, while base 29 corresponds to a pattern cooperating with such design, that is appreciated in its annular path 27'.

Figure 26:
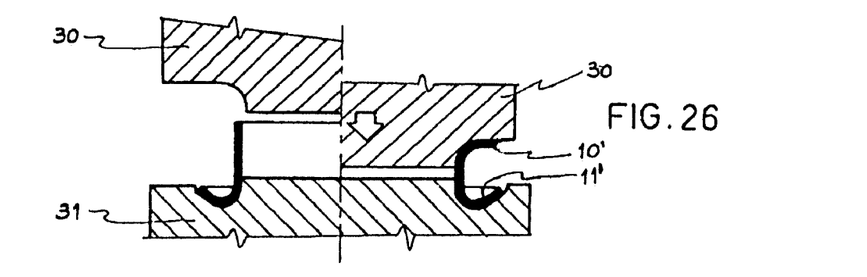
FIG. 26 is a schematic vertical section showing a step to form the fin ring that is subsequent to the step represented in the previous figure.
Figure 27:
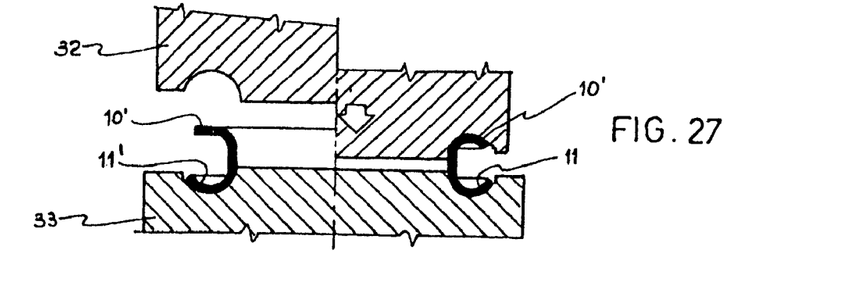
FIG. 27 is a schematic vertical section showing a step to form the fin ring that is subsequent to the step represented in the previous figure.

The step of removing the bottom 21 is similar to the one indicated in FIG. 21, while in the steps shown in FIGS. 26 and 27, stamping dies 30, 31, 32, and 33 appear, specially created to bring a final form to a metal sheet ring preform having a cross section defining a "C" of curved fins 10' and 11.

Figures 28, 29, 31:
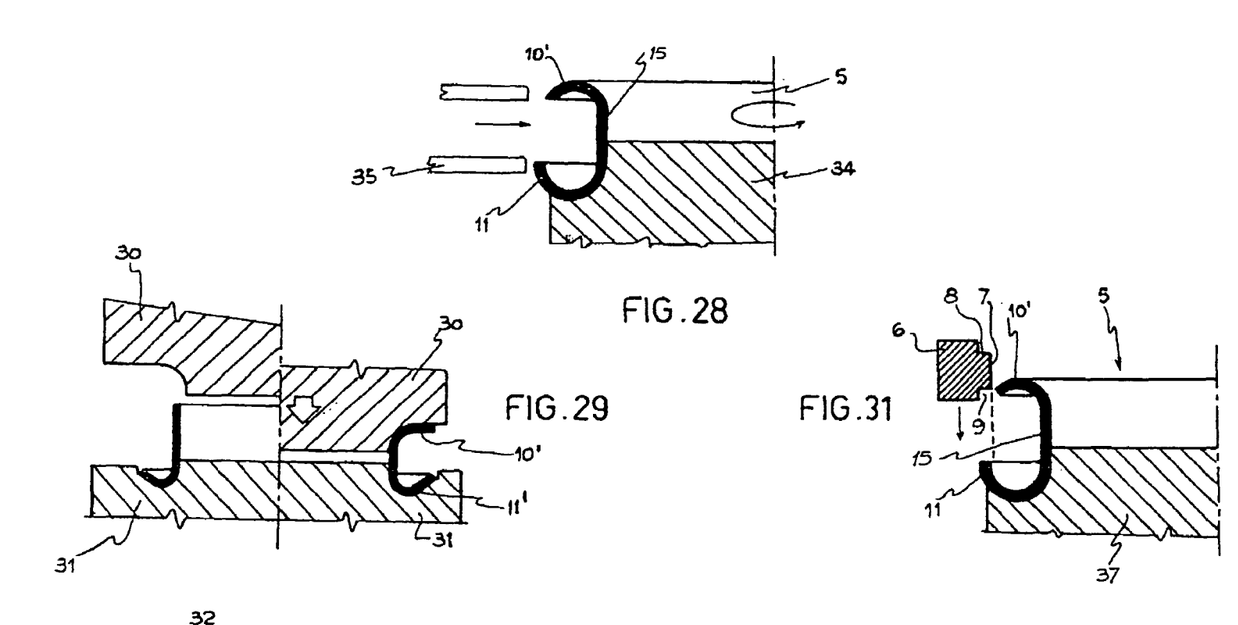
FIG. 28 is also a schematic vertical section that, in this case, shows an adjustment or calibrating of the diameters of the fins of the "U" channel of the fin ring being formed according to the method herein.
FIG. 29 is a schematic vertical section showing that, with the present invention, it is possible to form a fin ring capable of coupling to a support hoop, such as the one represented in FIGS. 31 and 32.
FIG. 31 is a schematic vertical section showing the fin ring formed according to FIGS. 14 and 15, when it is presented in the carrier hoop for its mounting.

Now turning to FIG. 28, a subsequent calibration step can be appreciated, wherein the preformed metal sheet ring 5 is mounted on a rotating support 34 such that, by means of a cutting tool 35, the diameter of the free end of fins 10' and 11 may be precisely determined, and eventual rough edges or surface irregularities removed.

Figure 32:
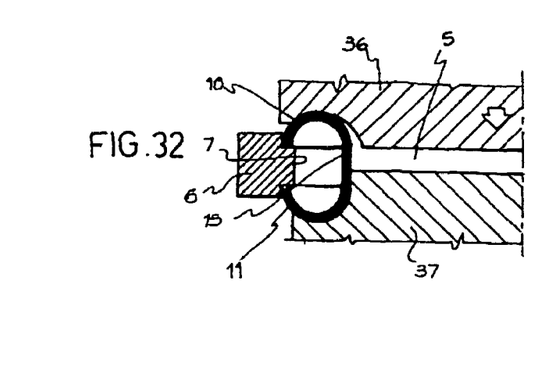
FIG. 32 is also a schematic vertical section, showing the final mounting of the fin metal sheet ring in a preferred carrier hoop, according to the inventive method.

The method herein is especially advantageous to produce metal sheet rings capable of being coupled to an assembly like the one shown in FIGS. 31 and 32.

It is an assembly wherein the annular support 6 includes a pair of annular coupling steps 8 and 9 created to house the free ends of the fins 10' and 11', a coupling zone being the place where the welding process to constitute the hermetic union seal is carried out.

In order to insert the ring 5 in the support 6, it is required that each fin 10' have an end diameter less than the diameter of the inside face 7 of the support 6 (FIG. 31).

Once positioned, the final stamping is carried out by means of external stamping dies 36 and 37 (FIG. 32).

Figure 30:
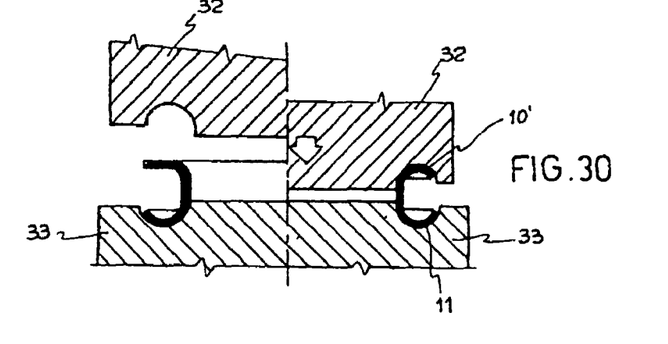
FIG. 30 is a schematic vertical section showing a step to form the fin ring that is subsequent to the step showed in the previous figure.

In this case, it is only required that the stamping die 32 (FIG. 30) makes a pre-form of this fin 10' limiting its end diameter to the measurement required for the further positioning.

The invention claimed is:

1. A method of mounting a metal sheet ring on a carrier hoop to form an annular cooling tube of a piston of an internal combustion engine the metal sheet ring, having a cross section including a web extending between two fins projecting towards the carrier hoop, wherein the free ends of said fins rest on and couple to respective annular seats each defined in a radially internal face of the carrier hoop, said free ends being sealed by respective annular welding beads extending along the free ends the carrier hoop, thereby forming the internal annular cooling tube, which has an inside surface defined by the metal sheet ring and an internal diametrical surface of the carrier hoop extending between the annular seats, comprising:

providing the metal sheet ring as a preform, outside the carrier hoop, having a cross section including a web defining an internal diameter and extending between two preform fins that both project from the web such that free ends of both of the fins lie outward of the web with respect to the radial direction of the preform, wherein the diameter of the free end of a first of said preform fins is less than the diameter of the interior surface of the carrier hoop in which its annular seat is defined, whereas the diameter of the free end of the other preform fin is greater than the diameter of the interior surface of the carrier hoop in which its annular seat is defined;

positioning said preform in the carrier hoop (6); and subsequent to the positioning, configuring said preform into said annular cooling tube defined by free ends of the metal sheet ring in engagement with the annular seats of the carrier hoop.

2. The method according to claim 1, wherein the configuring of the preform is done such that the metal sheet ring has a greater height than the carrier hoop and the fins thereof are oriented in convergent directions towards one another and towards their respective annular seats on the carrier hoop.

3. The method according to claim 2, wherein the carrier hoop includes a cross section of a truncated cone, and the annular seats on the carrier hoop are defined in the cross section of a truncated cone.

4. The method according to claim 1, wherein the configuring of the preform is done such that one of the fins of the metal sheet ring is oriented perpendicular to a radially internal face of the carrier hoop and the other fin follows a curved line and then finishes in a final straight path extending up to its seat, the final straight path being in a cross direction to said one of the fins.

5. The method according to claim 1, wherein the configuring of the preform is done such that the metal sheet ring has a greater height than the carrier hoop and both of its fins are curved, with ending paths thereof each oriented in a cross direction to a plane in which the carrier hoop lies.

6. The method of claim 1, wherein one of the preform fins diverges from the radial direction of the preform at an angle larger than any angle from the radial direction of the preform at which the other preform fin diverges.

* * * * *